United States Patent
Niewels et al.

(10) Patent No.: US 10,093,055 B2
(45) Date of Patent: Oct. 9, 2018

(54) COMPONENT OF A MOLDING SYSTEM FOR COOLING A MOLDED ARTICLE

(71) Applicant: Husky Injection Molding Systems Ltd., Bolton (CA)

(72) Inventors: Joachim Johannes Niewels, Thornton (CA); Scott Michael Stedman, Mississauga (CA); Jean-Christophe Witz, Yutz (FR); Sven Kmoch, Platten (DE); Ralf Walter Fisch, Saarburg (DE); Ruud Maria Theodorus Luijs, VR Utrecht (NL); Peter Yankov, Bolton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 66 days.

(21) Appl. No.: 15/363,252

(22) Filed: Nov. 29, 2016

(65) Prior Publication Data

US 2017/0072609 A1 Mar. 16, 2017

Related U.S. Application Data

(62) Division of application No. 14/409,076, filed as application No. PCT/CA2013/050420 on May 31, 2013, now Pat. No. 9,539,751.

(60) Provisional application No. 61/663,072, filed on Jun. 22, 2012, provisional application No. 61/662,616, filed on Jun. 21, 2012.

(51) Int. Cl.
*B29C 45/73* (2006.01)
*B29C 45/42* (2006.01)
*B29C 45/72* (2006.01)
*B29L 31/00* (2006.01)

(52) U.S. Cl.
CPC ...... *B29C 45/7312* (2013.01); *B29C 45/4225* (2013.01); *B29C 45/7207* (2013.01); *B29C 45/73* (2013.01); *B29C 2045/7214* (2013.01); *B29K 2995/0013* (2013.01); *B29L 2031/712* (2013.01)

(58) Field of Classification Search
CPC ........ B29C 2045/7214; B29C 45/4225; B29C 45/7207; B29C 45/73; B29C 45/7312; B29K 2995/0013
See application file for complete search history.

(56) References Cited

U.S. PATENT DOCUMENTS

| | | | |
|---|---|---|---|
| 6,413,075 B1 | 7/2002 | Koch et al. | |
| 7,717,697 B2 | 5/2010 | Hutchinson et al. | |
| 2007/0108668 A1* | 5/2007 | Hutchinson | B29C 33/04 264/521 |

FOREIGN PATENT DOCUMENTS

| | | |
|---|---|---|
| GB | 1448511 A | 9/1976 |
| GB | 2362156 | * 11/2001 |
| JP | 62-080015 | * 4/1987 |

OTHER PUBLICATIONS

Electronic translation of JP 62-80015. Year 2018.*

(Continued)

*Primary Examiner* — Jill L Heitbrink

(57) ABSTRACT

Disclosed herein, amongst other things is a component of a molding system (e.g. mold component, post-mold component, etc.) having a heat dissipater that is configured to impart a profiled heat removal rate on a selected portion of a molded article that generally matches a heat distribution therein.

10 Claims, 13 Drawing Sheets

(56) References Cited

OTHER PUBLICATIONS

PCT International Search Report; Cuerrier, Pierre; dated Jun. 14, 2013; 3 pages.
'Heiss Und Kalt', Plastverarbeiter, Huethig GmbH, Heidelberg, Germany, vol. 49, No. 5, May 1, 1998, pp. 26-28, 30, XP000765963.
European Search Report, dated Mar. 30, 2016, 7 pages.

\* cited by examiner

US 10,093,055 B2

COMPONENT OF A MOLDING SYSTEM FOR COOLING A MOLDED ARTICLE

CROSS-REFERENCE TO RELATED APPLICATIONS

This application is a divisional of U.S. patent application Ser. No. 14/409,076 filed Dec. 18, 2014, which is the U.S. National Stage of PCT/CA2013/050420 filed May 31, 2013, which claims priority from U.S. Provisional patent application 61/662,616 filed 21 Jun. 2012 and U.S. Provisional patent application 61/663,072 filed 22 Jun. 2012, the disclosures of which are incorporated herein by reference.

TECHNICAL FIELD

Non-Limiting embodiments disclosed herein generally relate to a component of a molding system for cooling a molded article.

SUMMARY OF THE INVENTION

A first aspect of the present invention is to provide a component of a molding system including a heat dissipater that is configured to impart a profiled heat removal rate on a selected portion of a molded article that generally matches a heat distribution therein.

A second aspect of the present invention is to provide a mold stack, including one of more components of a molding system including a heat dissipater that is/are configured to impart a profiled heat removal rate on a selected portion of a molded article that generally matches a heat distribution therein.

A third aspect of the present invention is to provide a method of cooling a molded article, comprising cooling a selected portion of a molded article with a component of a molding system, wherein a heat dissipater therein imparts a profiled heat removal rate on the selected portion of the molded article that generally matches a heat distribution therein.

These and other aspects and features of non-limiting embodiments will now become apparent to those skilled in the art upon review of the following description of specific non-limiting embodiments of the invention in conjunction with the accompanying drawings.

DETAILED DESCRIPTION OF THE DRAWINGS

The non-limiting embodiments will be more fully appreciated by reference to the accompanying drawings, in which.

Figure 1:
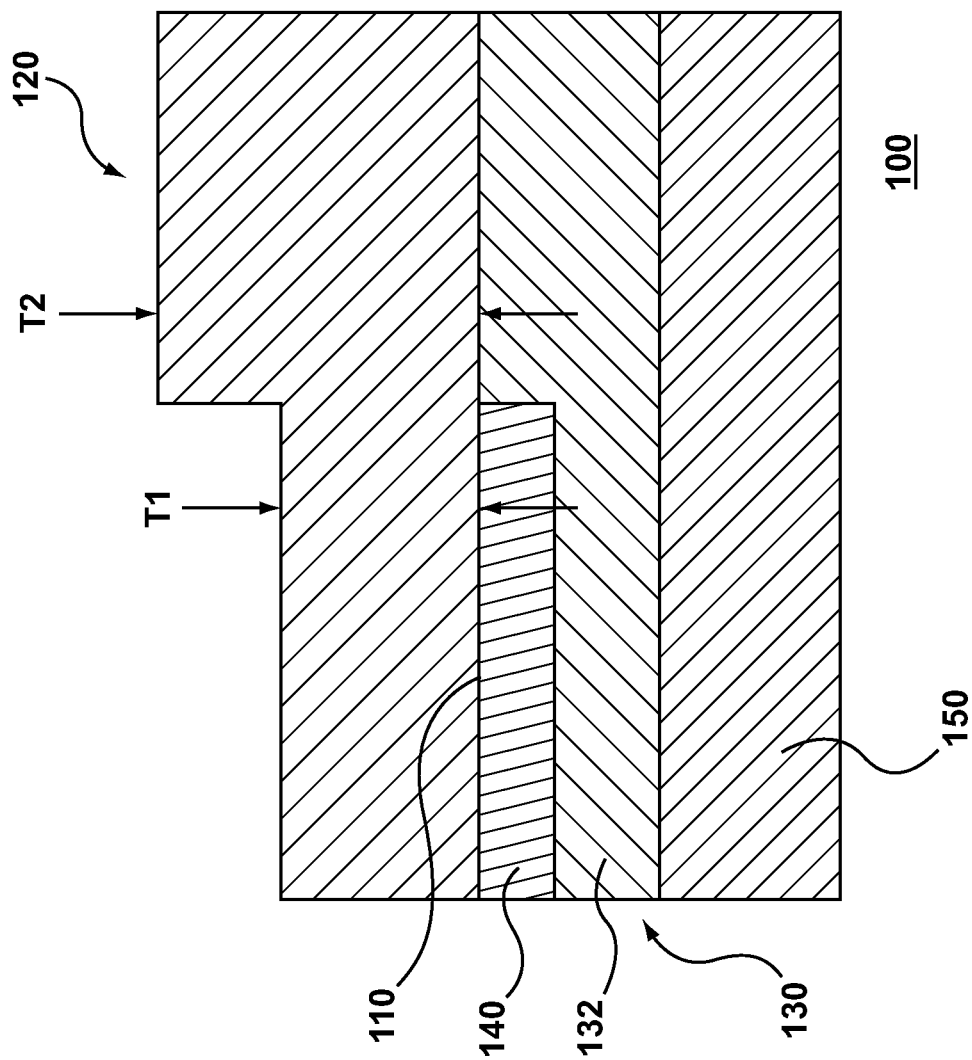
FIG. 1 depicts a section view through a component of a molding system according to a first non-limiting embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE EMBODIMENT(S)

Introduction

Reference will now be made in detail to various non-limiting embodiment(s) of various components of a molding system with which to provide profiled cooling of a selected portion of a molded article, such as, for example, a neck portion of a preform of the type that is blow moldable into a container. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Contemporary components of a molding system (e.g. mold components, post-mold components, etc.) for cooling a molded article do not truly take into consideration the actual part geometry. A mold component may be considered to be a component of a mold (i.e. a part of the molding system that defines a molding cavity within which to mold the molded article). A post-mold component may be considered to be a component of a post-mold device (i.e. a part of the molding system that operates to cool the molded article outside of the mold).

Even a mold component having so-called conforming cooling, such as that described in U.S. Pat. No. 7,234,930 to Niewels, would provide for only limited improvement as it would attempt to remove the same heat from thin and thick sections of the molded article.

Improved dimensional stability may be achieved by evenly cooling the part so that all sections (i.e. thick and thin) have approximately the same temperature at mold opening. A technical effect of the foregoing may include even shrinkage of the molded article. Therefore, what is proposed herein is a component of a molding system having a heat dissipater that is configured to impart a profiled heat removal rate on a selected portion of a molded article that generally matches a heat distribution therein. Generally speaking, the foregoing means that that the profiled heat removal rate is configured to vary with a thickness of the selected portion of the molded article. As such one or more thick sections of the molded article (i.e. section that have the most heat) may be cooled at a higher rate than one or more thin sections of the molded. Put another way, the invention proposes a heat dissipater for a component of the molding system that is configured to cool the selected portion of the molded article in an asymmetric style that considers the specific geometry thereof and that delivers selective cooling rates with higher rates directed to the slower cooling sections (i.e. thicker sections) and lower cooling rates directed at the faster cooling section (i.e. thinner sections).

Non-limiting embodiments of the heat dissipater include, for example, and without specific limitation, structures for conduction cooling of the selected portion of the molded article having one or both of a thermal conductivity that varies as a function of a thickness of the selected portion of the molded article and a coolant channel that has a profile that varies such that its separation distance to the molded article varies inversely to a thickness of the selected portion of the molded article. Similarly, further non-limiting embodiments of the heat dissipater include, for example, and without specific limitation, structures for convective cooling of the selected portion of the molded article having a flow guide with which to guide a flow of a treatment fluid over the selected portion of the molded, wherein the flow has a profile that varies such that its separation distance to the molded article varies inversely to a thickness of the selected portion of the molded article.

Non-Limiting Embodiments

With reference to FIG. 1, there is depicted a section view through a component 100 of a molding system in accordance with a first non-limiting embodiment with which to impart a profiled heat removal rate on a selected portion of a molded article 120 that generally matches a heat distribution therein. The component 100 is shown to include, amongst other things, a heat dissipater 130 with which to conduction cool the selected portion of the molded article 120 that is in contact with a heat pickup surface 110 thereof in accordance with a heat distribution therein. The heat dissipater 130 broadly includes a first body 132 having a first thermal conductivity and a second body 140 inset therein having a second thermal conductivity. The heat dissipater 130 also includes a heat removal structure 150 in the form of a coolant channel that is defined by the first body 132 through which a coolant may be circulated, in use, to remove heat therefrom. Alternatively, the heat removal structure 150 may be provided by other suitable means, such as, for example, a thermoelectric device. A first portion of the heat pickup surface 110 is defined along the first body 132. A second portion of the heat pickup surface 110 is defined along the second body 140. In this non-limiting embodiment the first thermal conductivity of the first body 132 is greater than that of the second thermal conductivity of the second body 140 such that a relatively thin portion (indicated as having thickness T1) of the molded article 120 that is in contact with the second portion of the heat pickup surface 110 is cooled at a slower rate than a relatively thick portion (indicated as having thickness T2) of the molded article 120 that is in contact with the first portion of the heat pickup surface 110.

Figure 2:
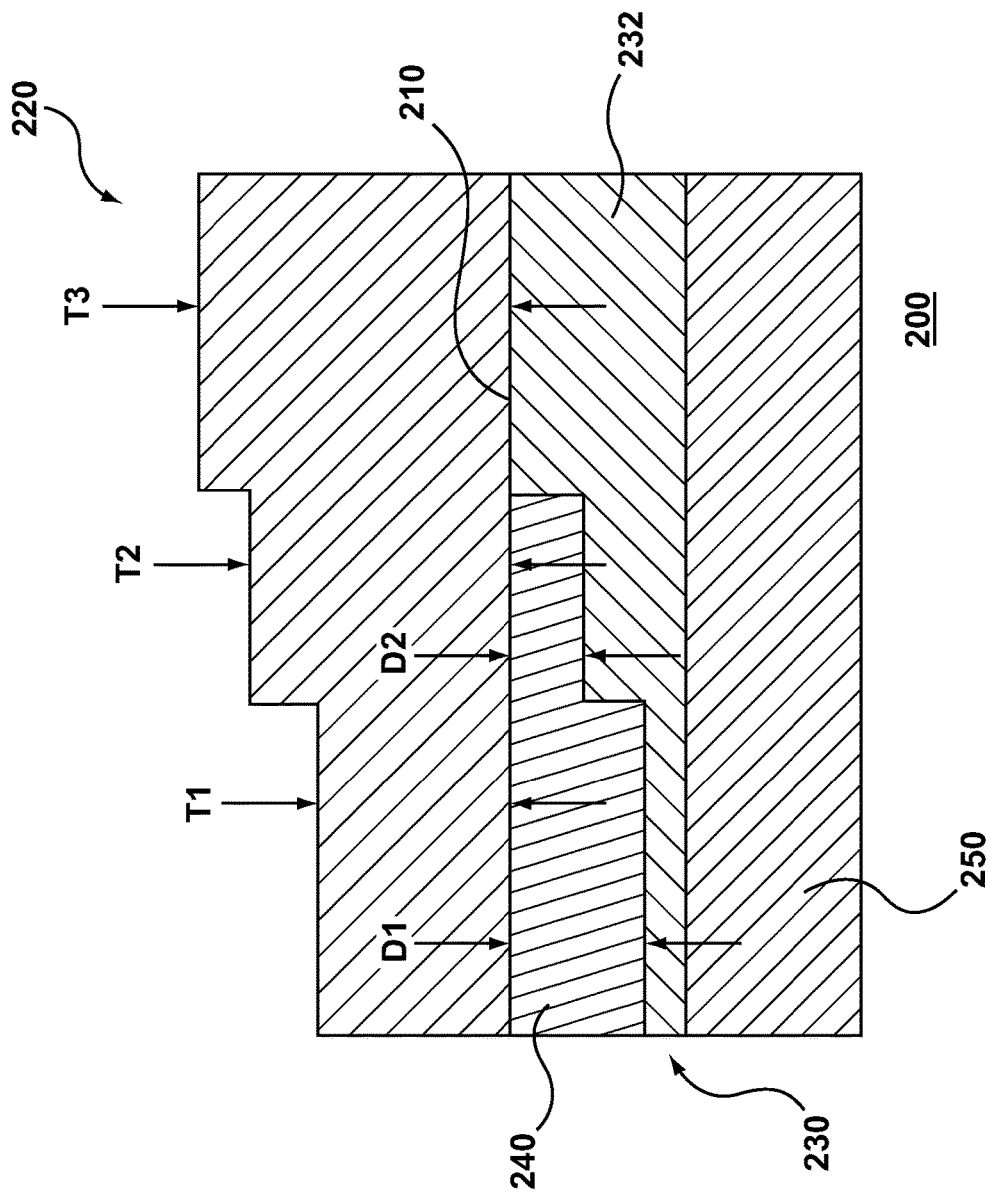
FIG. 2 depicts a section view through a component of a molding system according to a second non-limiting embodiment.

With reference to FIG. 2, there is depicted a section view through a component 200 of a molding system in accordance with a second non-limiting embodiment with which to impart a profiled heat removal rate on a selected portion of a molded article 220 that generally matches a heat distribution therein. The component 200 is shown to include, amongst other things, a heat dissipater 230 with which to conduction cool the selected portion of the molded article 120 that is in contact with a heat pickup surface 210 thereof in accordance with a heat distribution therein. The heat dissipater 230 broadly includes a first body 232 having a first thermal conductivity and a second body 240 inset therein having a second thermal conductivity. The heat dissipater 230 also includes a heat removal structure 250 in the form of a coolant channel that is defined by the first body 232 through which a coolant may be circulated, in use, to remove heat therefrom. A first portion of the heat pickup surface 210 is defined along the first body 232. The second body 240 is of varying depth (indicated as having depths D1 and D2), wherein a second portion of the heat pickup surface 210 is defined along a first portion of the second body 240 having depth D1 (thick portion) and a third portion of the heat pickup surface 210 is defined along a second portion of the second body 240 having depth D2 (thin portion). In this non-limiting embodiment the first thermal conductivity of the first body 232 is greater than that of the second thermal conductivity of the second body 240 and as a result, the thickest portion (indicated as having thickness T3) of the molded article 220 that is in contact with the first portion of the heat pickup surface 210 is cooled at a faster rate than the second and third portions of the molded article 220 that are in contact with the second and third portions of the heat pickup surface 210. In addition, because of the varying depth of the second body 240, the thinnest portion (indicated as having thickness T1) of the molded article 220 that is in contact with the second portion of the heat pickup surface 210 is cooled at a slower rate than a middle portion (indicated as having thickness T2) of the molded article 220 that is in contact with the third portion of the heat pickup surface 210.

Figure 3:
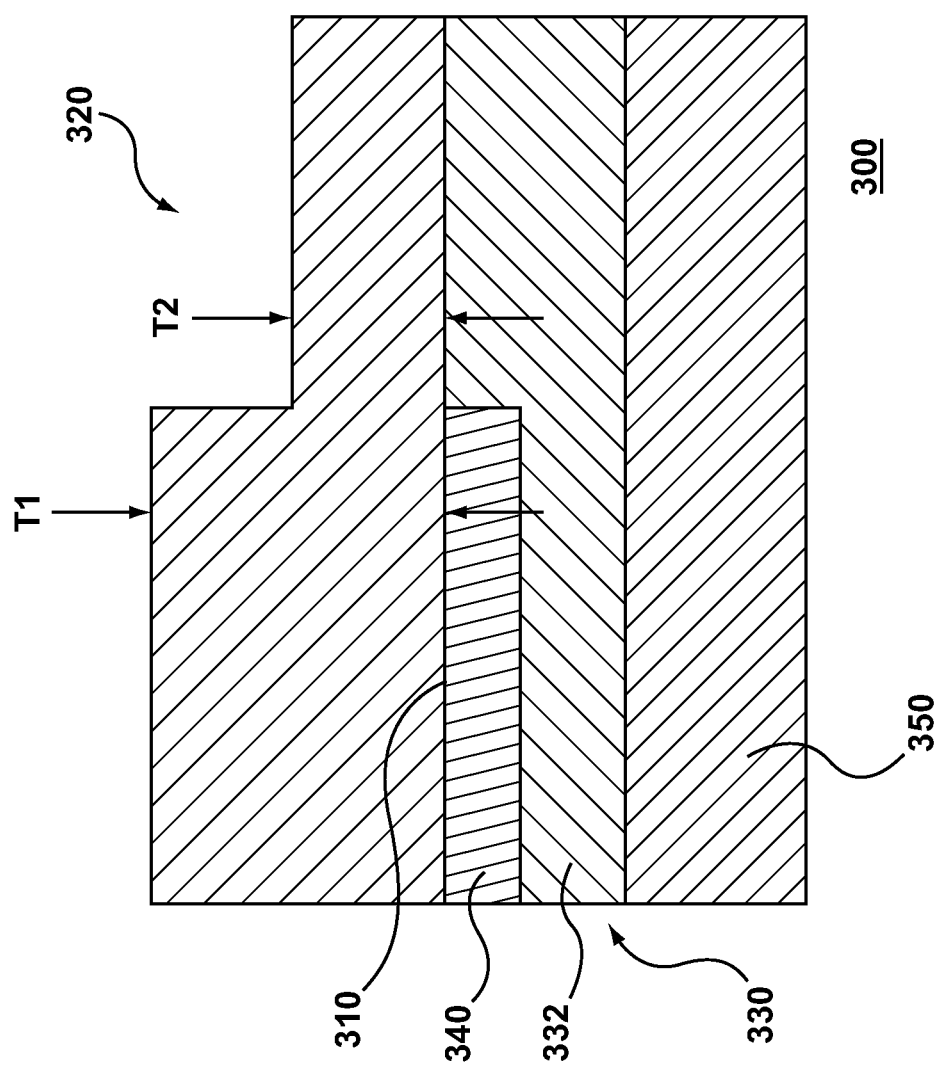
FIG. 3 depicts a section view through a component of a molding system according to a third non-limiting embodiment.

With reference to FIG. 3, there is depicted a section view through a component 300 of a molding system in accordance with a third non-limiting embodiment with which to impart a profiled heat removal rate on a selected portion of a molded article 320 that generally matches a heat distribution therein. The component 300 is shown to include, amongst other things, a heat dissipater 330 with which to conduction cool the selected portion of the molded article 320 that is in contact with a heat pickup surface 310 thereof in accordance with a heat distribution therein. The heat dissipater 330 broadly includes a first body 332 having a first thermal conductivity and a second body 340 inset therein having a second thermal conductivity. The heat dissipater 330 also includes a heat removal structure 350 in the form of a coolant channel that is defined by the first body 332 through which a coolant may be circulated, in use, to remove heat therefrom. A first portion of the heat pickup surface 310 is defined on the first body 332. A second portion of the heat pickup surface 310 is defined along the second body 342. In this non-limiting embodiment the first thermal conductivity of the first body 332 is less than the second thermal conductivity of the second body 340 such that a relatively thick portion (indicated as having thickness T1) of the molded article 320 that is in contact with the second portion of the heat pickup surface 310 is cooled at a faster rate than a relatively thin portion (indicated as having thickness T2) of the molded article 320 that is in contact with the first portion of the heat pickup surface 310.

Further non-limiting embodiments will described next that are specifically directed to the cooling of molded articles in the form of preforms of the type that are blow moldable to form containers. That being said, these specific non-limiting executions may have broader applicability to the cooling of other varieties of molded articles (not shown).

Figure 4:
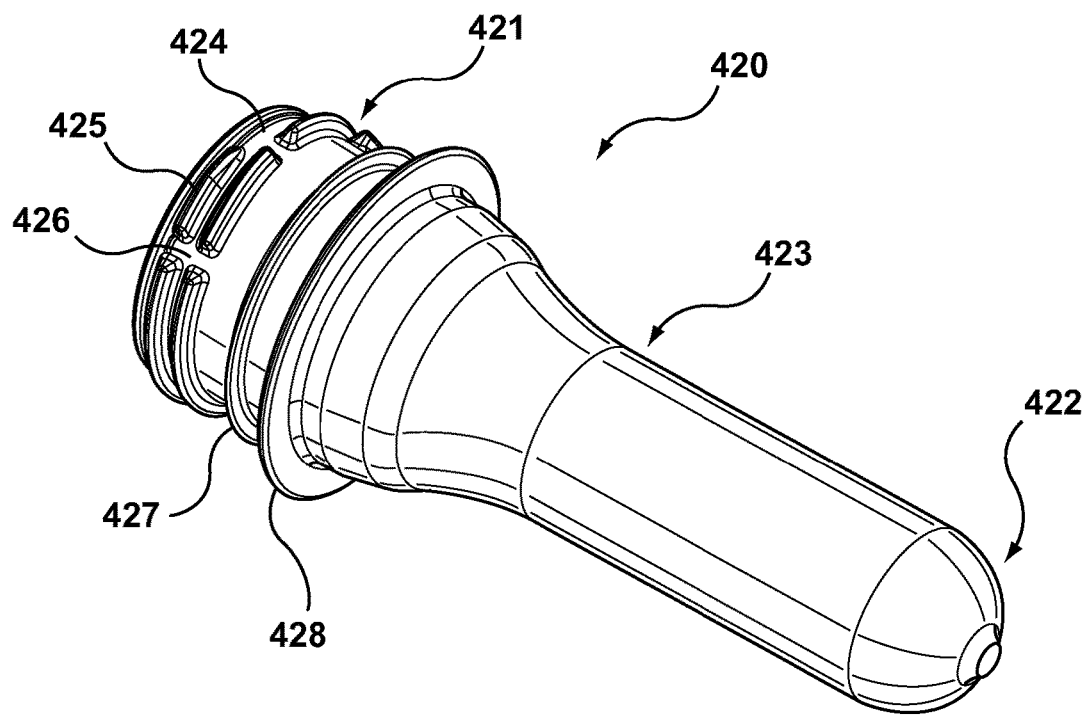
FIG. 4 depicts a perspective view of a molded article that is configured as a preform of the type that is blow moldable to form a container.

With reference to FIG. 4, there is depicted a non-limiting example of such a molded article 420 (i.e. preform). The preform 420 broadly includes a neck portion 421, a gate portion 422 and a body portion 423 extending therebetween. The neck portion 421 is configured to receive a closure (also known as a cap) for a capping thereof. The neck portion is characterized by a cylindrical wall 424 having a thread 425 protruding on an outer surface thereof. The thread 425 is configured to releasably engage a complementary thread on the interior of the closure (not shown). The thread 425 is also shown to be interrupted by a number of axial slots 426 (i.e. vents). The neck finish 421 also includes a pilfer band 427 positioned beneath the thread 425 with which to cooperate with cams that are defined on a tamper evident band (not shown) of the closure (not shown). Lastly, the neck portion 421 further includes a support ledge 428 positioned beneath the pilfer band 427 with which to cooperate with downstream handling equipment, blow molds and the like.

Figure 5:
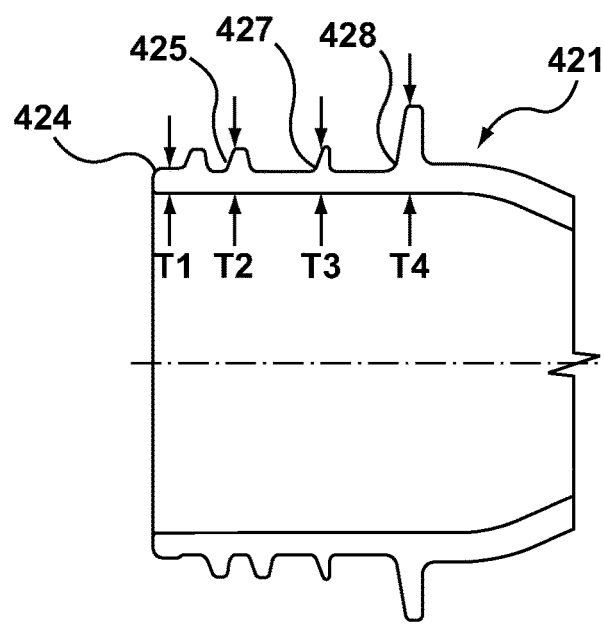
FIG. 5 depicts a section view through a neck portion of the preform of FIG. 4.

With reference to FIG. 5, there is depicted a section view through the neck portion 421 of the molded article 420 that reveals the undulating varying thicknesses (indicated as T1, T2, T3, T4) of the various portions thereof.

The thickness of the cylindrical wall 424 portion is known in the bottling industry as the 'E-wall'. With the on-going trend of light-weighting threads and in particular thinning out the E-wall, to save on molding material, threads have become more and more in-homogeneous in terms of overall cross-sectional thickness. Unfortunately, this in-homogeneity in cross-sectional thickness has led to a high level of geometric deviation from the ideal part geometry. It is believed that this geometric deviation may be the result of uneven part shrinkage that in turn relates to the manner in which the preform is cooled in the mold.

As such, it is proposed to configure one or more components of the molding system 402 (FIG. 6) to include a heat dissipater (examples of which will be described next) that is configured to impart a profiled heat removal rate on the neck portion 421 of the molded article 420 that generally matches a heat distribution therein.

Figure 6:
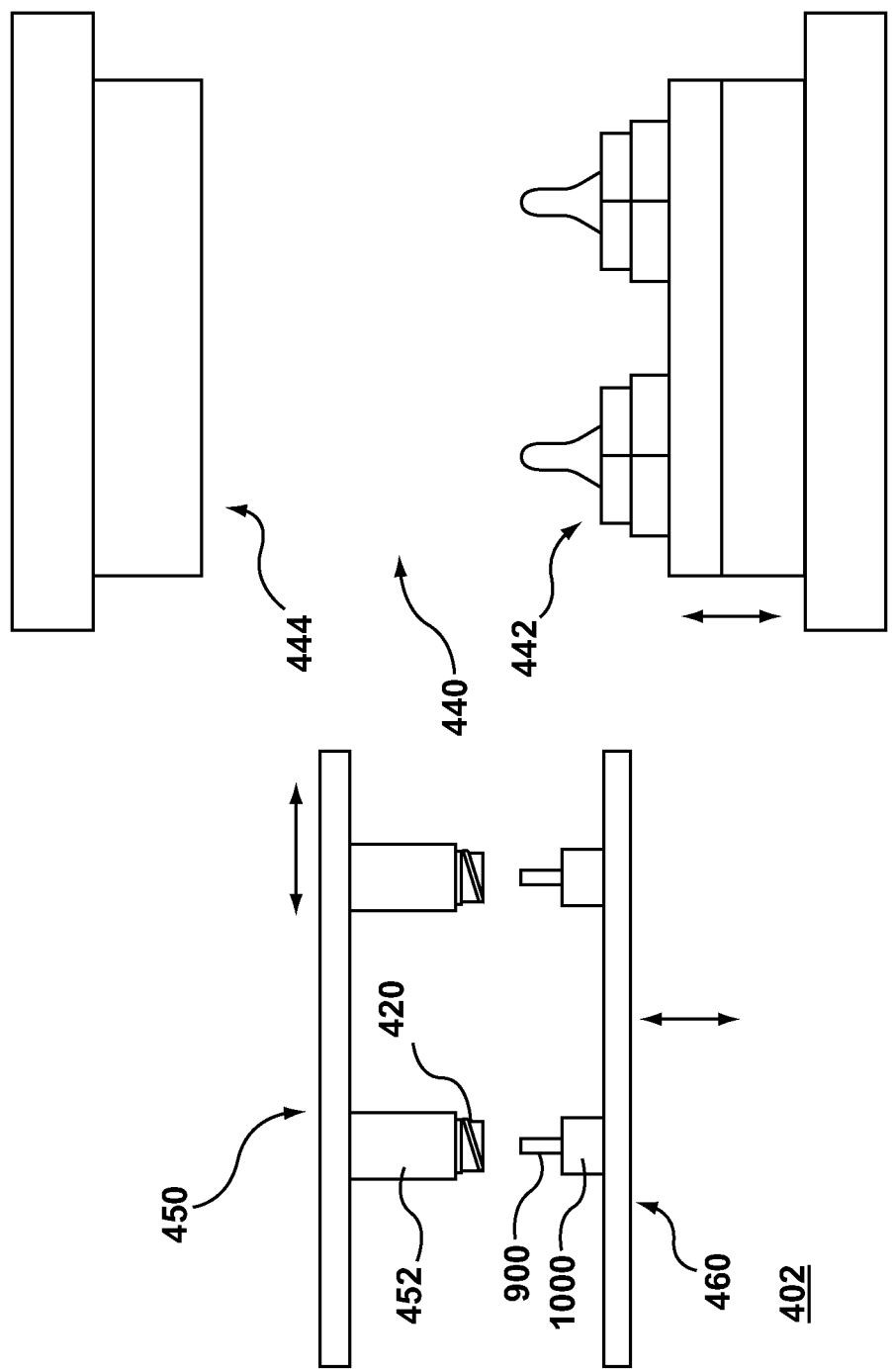
FIG. 6 depicts a schematic representation of a molding system according to a non-limiting embodiment.

With reference to FIG. 6, there is depicted a schematic representation of selected portions of the molding system 402 in accordance with a non-limiting embodiment. The molding system 402 broadly includes, amongst other things, a mold 440, a first post-mold device 450 and a second post-mold device 460. Not shown are a clamp unit for opening and closing of a first half 442 and a second half 444 of the mold 440 (relatively movable along the indicated directions) and an associated melt preparation unit for preparing and transferring molding material into the mold 440. Without going into unnecessary detail that is well known to those of skill in the art, that the mold 440 is configured to mold the molded articles 420. The first post-mold device 450 is configured to retrieve 440 (the first post-mold device 450 being movable along the indicated directions) and condition the molded articles (within carriers 452) from the mold 440. Lastly, the second post-mold device 460 is configured to engage the molded articles within the carriers 452 (the second post-mold device 460 being movable along the indicated directions) to further condition the molded articles (using various post-mold devices 900, 1000). A more detailed description of the foregoing may be referenced, for example, in U.S. Pat. No. 7,104,780 to Domodossola et al, published on Sep. 12, 2006.

Figure 7:
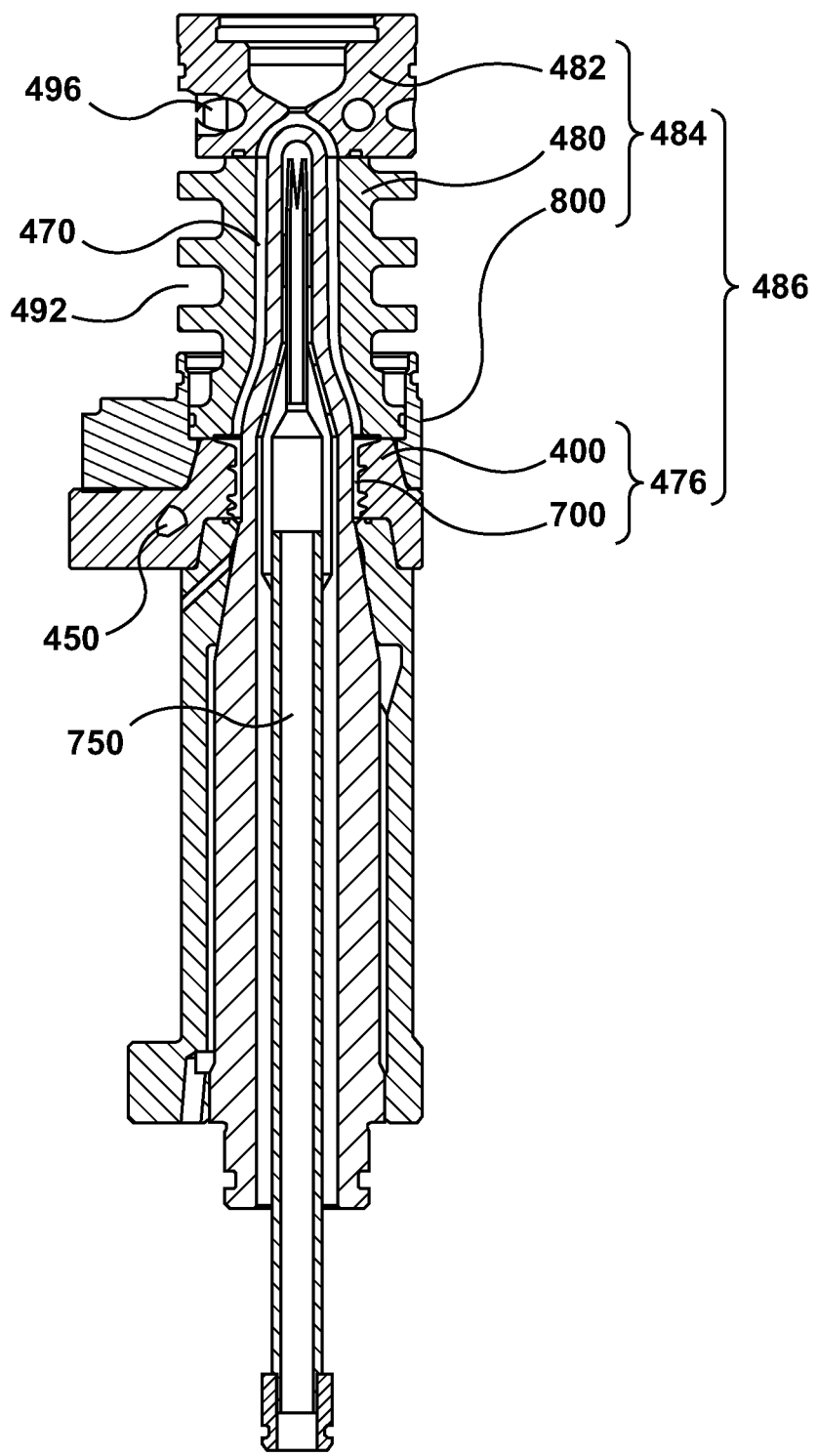
FIG. 7 depicts a section view through a mold stack for use in a mold according to a non-limiting embodiment.

With reference to FIG. 7, there is depicted a mold stack 486 for use in the mold 440 (FIG. 6). The mold stack 486 broadly includes a first stack portion 476 and a second stack portion 484 that are associated, in use, with the first mold half 442 and the second mold half 444, respectively. A molding cavity 470 is definable, in use, between the first stack portion 476 and the second stack portion 484 within which the molded article 420 of FIG. 4 is moldable.

The first stack portion 476 broadly includes various components (i.e. mold components), amongst others, of a core insert 700 and a split insert 400. The split insert 400 and the core 700 cooperate, in use, to define a neck portion of the molding cavity 470 (within which the neck portion of the molded article 420 is moldable). The core insert 700 is shown to include a heat removal structure 750 in the form of a coolant channel. The split insert 400 is also shown to include a heat removal structure 450 in the form of a coolant channel.

The second stack portion includes various mold components, amongst others, of a cavity insert 480, a gate insert 482 and an interface component 800. The cavity insert 480 and the core 700 cooperate, in use, to define a body portion of the molding cavity 470 (within which the body portion 423 of the molded article 420 is moldable). The gate insert 482 and the core 700 cooperate, in use, to define a gate portion of the molding cavity 470 (within which the gate portion 422 of the molded article 420 is moldable). The cavity insert 480 is shown to include a heat removal structure 492 in the form of a coolant channel. Lastly, the gate insert 482 is also shown to include a heat removal structure 496 in the form of a coolant channel.

Figure 8:
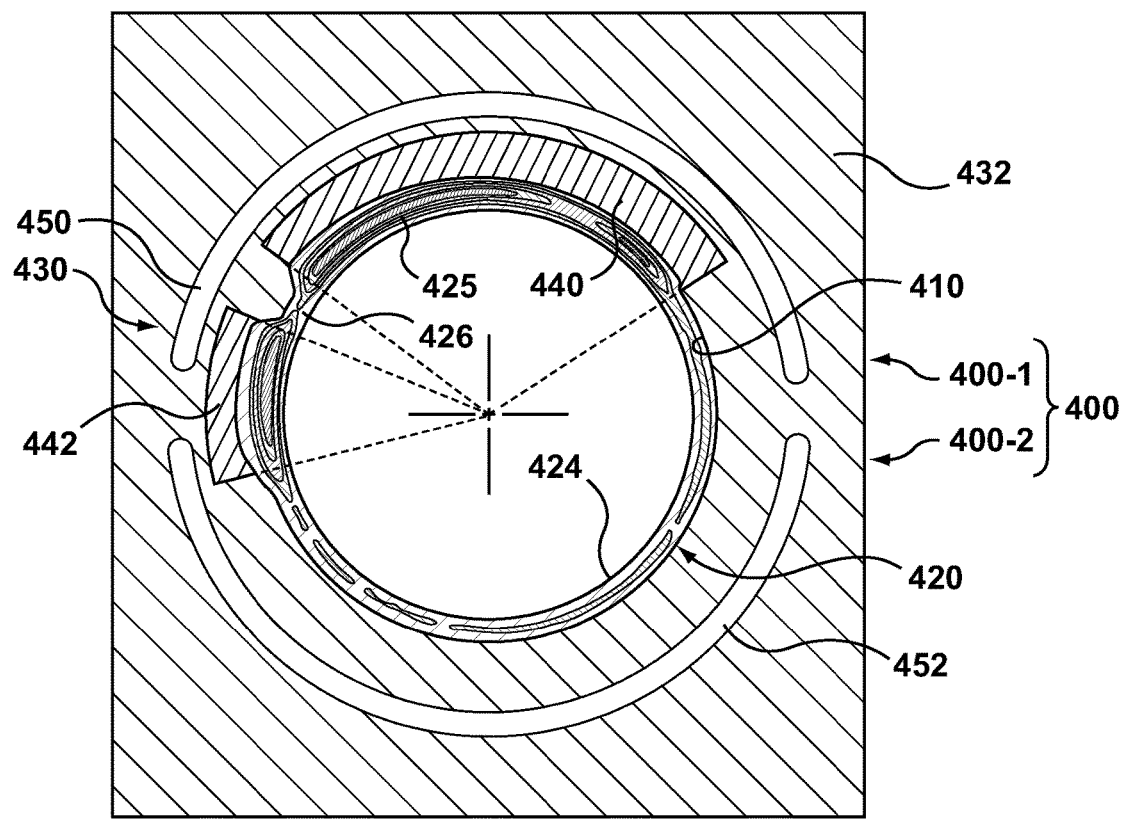
FIG. 8 depicts a section view through a component (i.e. split insert) of a mold stack according to a fourth non-limiting embodiment.

With reference to FIG. 8, there is depicted a section view through the mold component 400 (henceforth referred to as a split insert) of the mold stack 486 (FIG. 7) in accordance with a fourth non-limiting embodiment with which to impart a profiled heat removal rate on a selected portion of a molded article 420 that generally matches a heat distribution therein. The split insert 400 are split into a first split insert 400-1 and a second split insert 400-2 along the centre line shown.

The split insert 400 is shown to include, amongst other things, a heat dissipater 430 with which to conduction cool the selected portion of the molded article 420 that is in contact with a heat pickup surface 410 thereof in accordance with a heat distribution therein. The heat dissipater 430 broadly includes a first body 432 having a first thermal conductivity, a second body 440 having a second thermal conductivity and a third body 442 having a third thermal conductivity. The second and third bodies 440 and 442 are inset into the first body 432. The heat dissipater 430 also includes heat removal structures 450, 452 defined in the first body 432 in the form of coolant channels through which a coolant may be circulated, in use, to remove heat therefrom. The second and third bodies 440 and 442 as well as the coolant channels may have a generally arcuate profile that follow, in general, a shape of the molded article 420. A first and a second portion of the heat pickup surface 410 are defined along the first body 432. A third portion of the heat pickup surface 410 is defined along the second body 440. Lastly, a fourth portion of the heat pickup surface 410 is defined along the third body 442. In this non-limiting embodiment the first thermal conductivity of the first body 432 is greater than that of the second thermal and third thermal conductivities of the second and third bodies 440, 442. The second and third thermal conductivities of the second and third bodies are generally the same. As such, the relatively thin cylindrical wall 424 and axial slot portions 426 of the molded article 420 that are in contact with the first portion and the second portion of the heat pickup surface 410 are cooled at a slower rate than the relatively thick thread portions 425 of the molded article 420 that are in contact with the third and fourth portions of the heat pickup surface 410.

Figure 9:
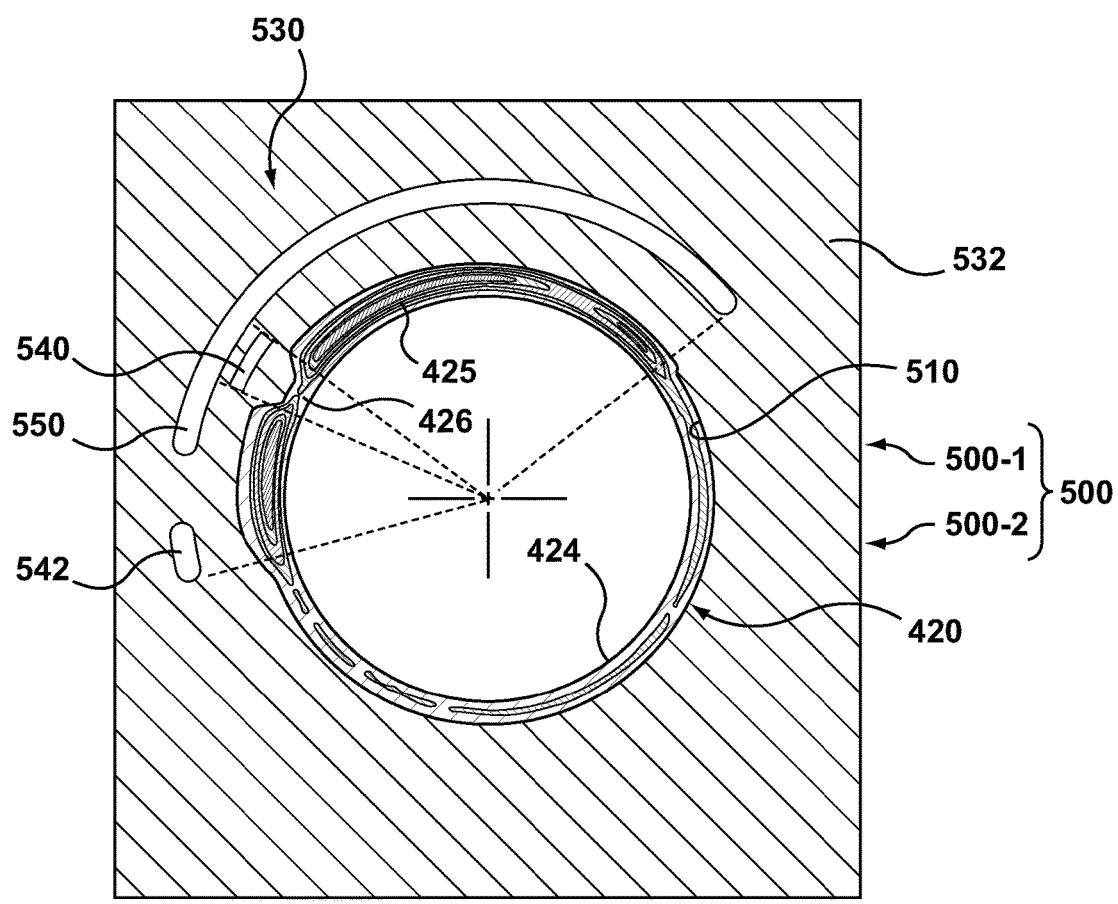
FIG. 9 depicts a section view through a component (i.e. split insert) of a mold stack according to a fifth non-limiting embodiment.

With reference to FIG. 9, there is depicted a section view through the mold component 500 (henceforth referred to as a split insert) for use in the mold stack 486 (FIG. 7) in accordance with a fifth non-limiting embodiment with which to impart a profiled heat removal rate on a selected portion of a molded article 520 that generally matches a heat distribution therein. The split insert 500 is split into a first split insert 500-1 and a second split insert 500-2 along the centre line shown.

The split insert 500 is shown to include, amongst other things, a heat dissipater 530 with which to conduction cool the selected portion of the molded article 420 that is in contact with a heat pickup surface 510 thereof in accordance with a heat distribution therein. The heat dissipater 530 broadly includes a first body 532 having a first thermal conductivity and a second body 540 (which may also be an air filled void) having a second thermal conductivity. The second body 540 is inset (in this case fully embedded) into the first body 532. The heat dissipater 530 also includes heat removal structures 550, 552 defined in the first body 532 in the form of coolant channels through which a coolant may be circulated, in use, to remove heat therefrom. The second body 540 as well as the coolant channels may have a generally arcuate profile that follow, in general, a shape of the molded article 520. Moreover, the coolant channels are positioned and otherwise extend in the first body 532 for exclusively cooling of the thread portion 425 of the molded article 420. The second body 540 is located between the heat pickup surface 510 and the heat removal structure 550 (coolant channel) adjacent to the axial portion 426. In operation, the second body 540 serves to lower a heat transfer rate from the portion of the heat pickup surface that contacts the axial portion 426 of the molded article 420.

Figure 10:
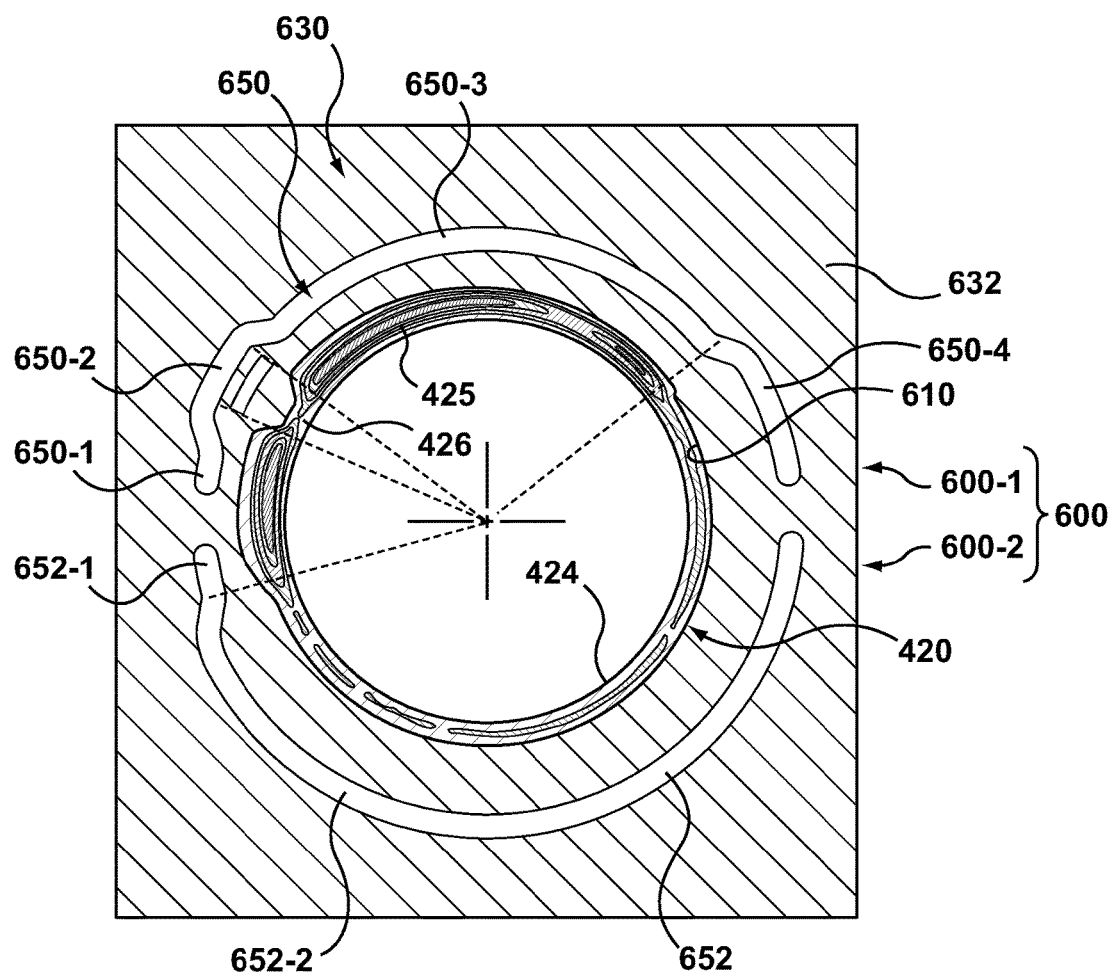
FIG. 10 depicts a section view through a component (i.e. split insert) of a mold stack according to a sixth non-limiting embodiment.

With reference to FIG. 10, there is depicted a section view through the mold component 600 (henceforth referred to as a split insert) for use in the mold stack 486 (FIG. 7) in accordance with a sixth non-limiting embodiment with which to impart a profiled heat removal rate on a selected portion of a molded article 420 that generally matches a heat distribution therein. The split insert 600 is split into a first split insert 600-1 and a second split insert 600-2 along the centre line shown.

The split insert 600 is shown to include, amongst other things, a heat dissipater 630 with which to conduction cool the selected portion of the molded article 420 that is in contact with a heat pickup surface 610 thereof in accordance with a heat distribution therein. The heat dissipater 630 broadly includes a first body 632 having heat removal structures 650, 652 defined therein in the form of coolant channels through which a coolant may be circulated, in use, to remove heat therefrom. These coolant channels are profiled such that a separation distance to the heat pickup surface 610 varies inversely to a thickness of the selected portion of the molded article 420. As such, the coolant channels are shown to be closer to the relatively thick thread portion 425 and further away from the relatively thin cylindrical wall 424 and axial slot portion 426, whereby a profiled heat removal rate is imparted on the selected portion of the molded article 420 that generally matches a heat distribution therein.

Figure 11:
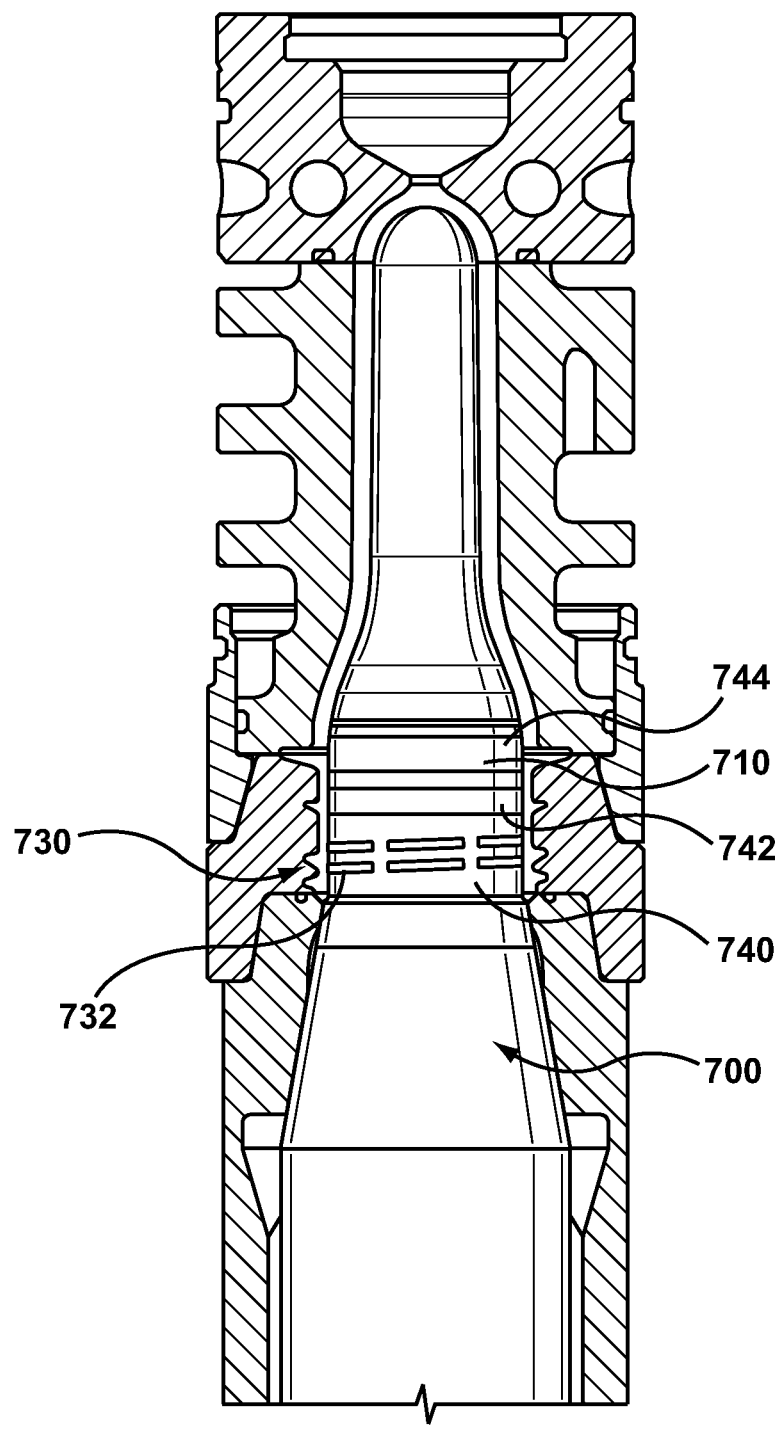
FIG. 11 depicts a side view of a component (i.e. core insert) of a mold insert according to a seventh non-limiting embodiment.

With reference to FIG. 11, there is depicted a section view through the mold component 700 (henceforth referred to as a core insert) for use in the mold stack 486 (FIG. 7) in accordance with a seventh non-limiting embodiment with which to impart a profiled heat removal rate on a selected portion of the molded article 420 that generally matches a heat distribution therein. The core insert 700 is shown to include, amongst other things, a heat dissipater 730 with which to conduction cool the selected portion of the molded article 420 that is in contact with a heat pickup surface 710 thereof in accordance with a heat distribution therein. The heat dissipater 730 broadly includes a first body 732 having a first thermal conductivity, a second body 740 inset therein having a second thermal conductivity, a third body 744 inset therein having a third thermal conductivity and a fourth body 740 inset therein having a fourth thermal conductivity. The heat dissipater 730 also includes a heat removal structure 750 (FIG. 7) in the form of a coolant channel that is defined by the first body 732 through which a coolant may be circulated, in use, to remove heat therefrom. A first portion of the heat pickup surface 710 is defined along the first body 732 for cooling the thread portion of the neck portion at a first heat removal rate. A second portion of the heat pickup surface 710 is defined along the second body 740 for cooling the cylindrical wall of the neck portion at a second heat removal rate. A third portion of the heat pickup surface 710 is defined along the third body 742 for cooling the pilfer band of the neck portion at a third heat removal rate. Lastly, a fourth portion of the heat pickup surface 710 is defined along the fourth body 744 for cooling the support ledge portion of the neck portion at a fourth heat removal rate. In this non-limiting embodiment the first thermal conductivity of the first body 732 is greater than that of the second thermal conductivity of the second body 740, whereby the thread portion of the molded article 420 is cooled at a faster rate than the cylindrical wall portion. In this non-limiting embodiment the third thermal conductivity of the third body 742 and the fourth thermal conductivity of the fourth body 744 are selected to enhance the heat flow from the relatively thick pilfer band and support ledge portions of the molded article 420. In essence, the relatively thick thread, pilfer band, and support ledge portions of the molded article 420 may again be cooled at a faster rate than the cylindrical wall.

Figure 12:
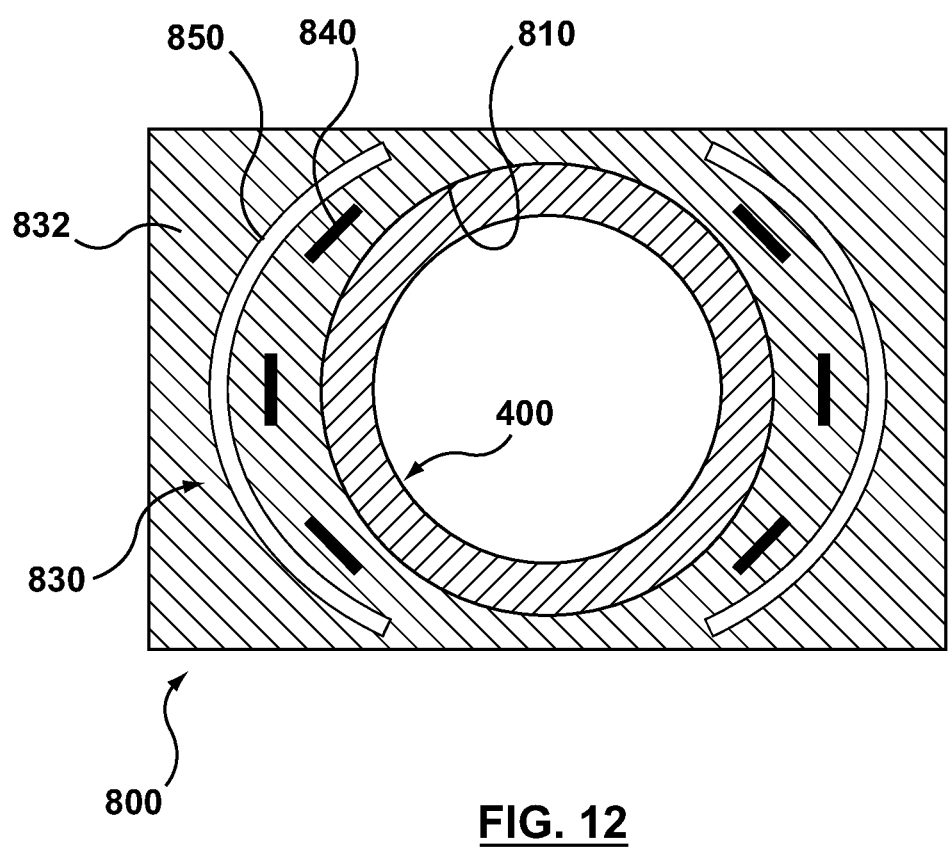
FIG. 12 depicts a section view through a component (i.e. interface component) of a mold stack according to an eighth non-limiting embodiment.

With reference to FIG. 12, there is depicted a section view through the mold component 800 (henceforth referred to as an interface component) for use in the mold stack 486 (FIG. 7) in accordance with an eighth non-limiting embodiment with which to impart a profiled heat removal rate on a selected portion of a molded article 420 (albeit indirectly) that generally matches a heat distribution therein. The interface component 800 (sometimes called a cavity flange) provides an interface between the cavity insert 480 (FIG. 7) and the split insert 400 (FIG. 7). The interface component 800 is shown to include, amongst other things, a heat dissipater 830 with which to conduction cool the selected portion of the molded article 120 that is in contact with the split insert 400. The heat dissipater 830 broadly includes a first body 832 having a first thermal conductivity and a plurality of bodies 840 (which may also be an air filled void) having a second thermal conductivity embedded therein. The heat dissipater 830 also includes a heat removal structure 850 in the form of a pair of coolant channels that are defined by the first body 832 through which a coolant may be circulated, in use, to remove heat therefrom. The plurality of bodies 840 are arranged to provide a profiled heat removal rate on a heat pickup surface 810 for providing a profiled cooling of the selected portion of the molded article in the split insert 400 that generally matches a heat distribution therein.

Figure 13:
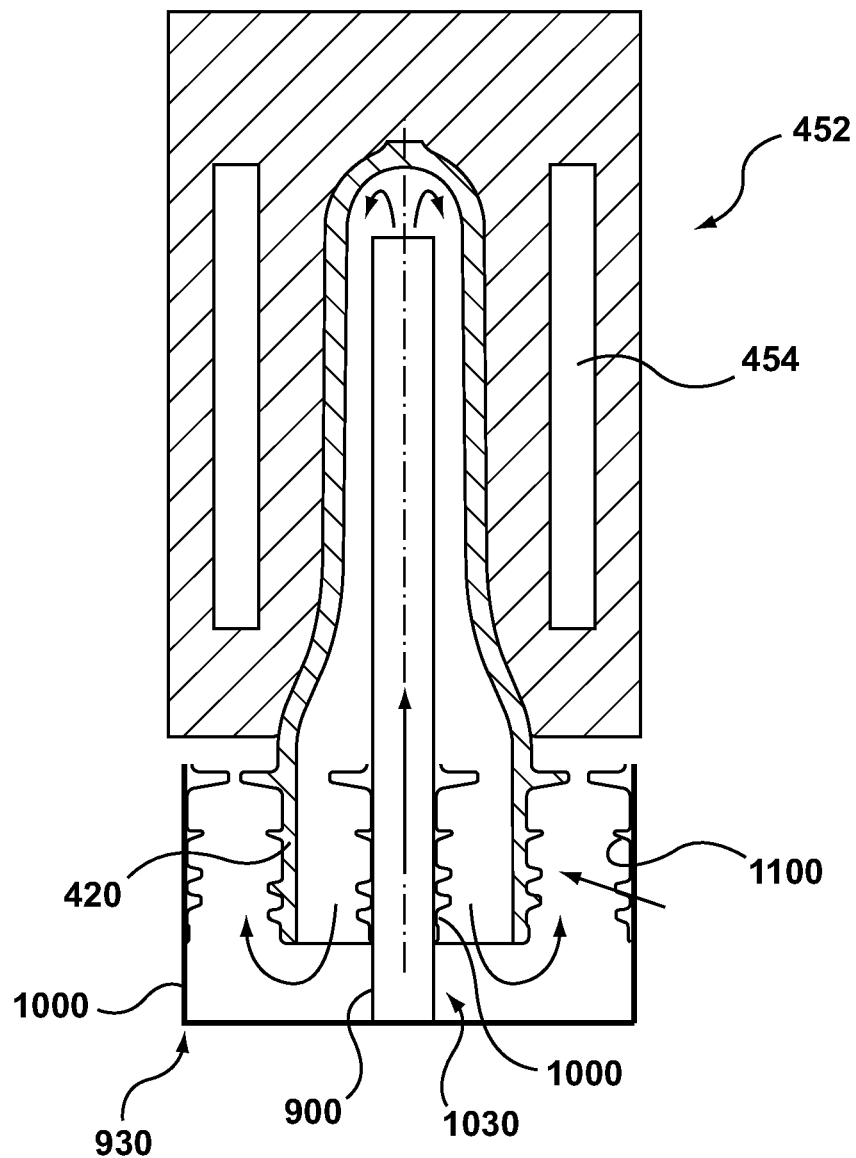
FIG. 13 depicts a section view through several components (i.e. post-mold components) of a post-mold device according to a ninth non-limiting embodiment.
Figure 14:
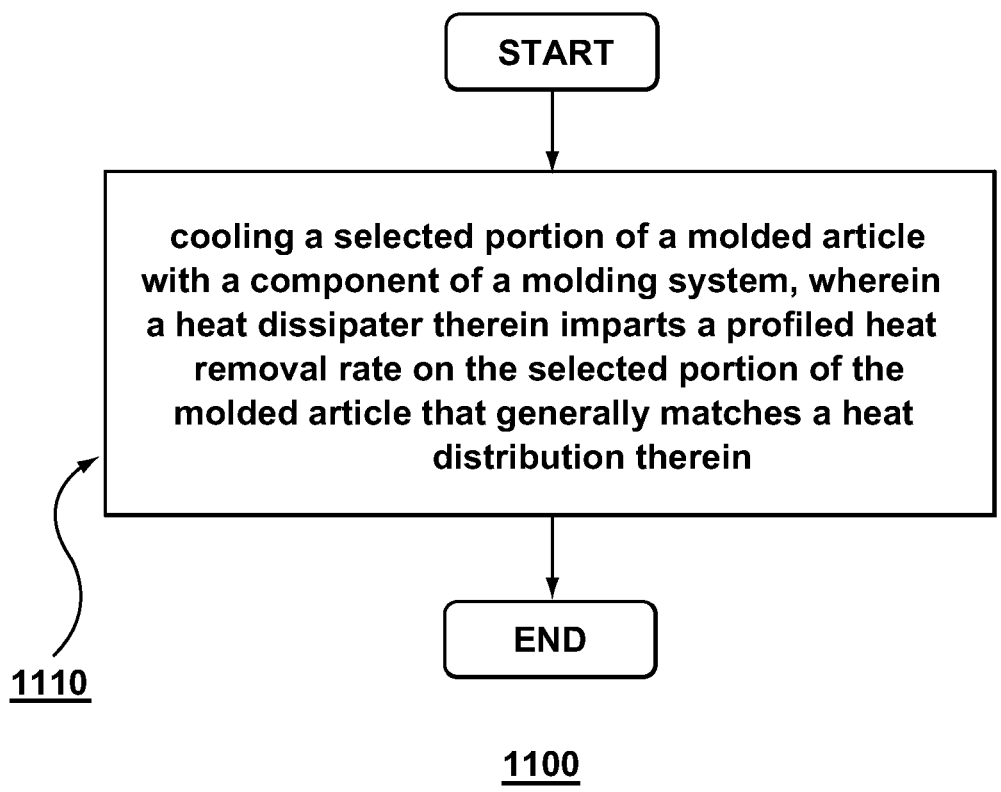
FIG. 14 depicts a flow chart of a method of cooling a molded article.

With reference to FIG. 13, there is depicted a section view through the post-mold components 452, 900 and 1000 for use in the first post-mold device 450 (FIG. 6) and the second post-mold device 460 (FIG. 6).

The post-mold component 452 (henceforth carrier 452) is configured to carry the molded article 452 therein. As such it defines a cavity for receiving the body and gate portions of the molded article 420. The carrier 452 includes a heat dissipation structure in the form of a coolant channel defined therein.

The post-mold components 900, 100 also include heat dissipaters 930, 1030 that define a flow guide 910, 1010 with which to guide a flow of a treatment fluid (e.g. air) over the selected portion of the molded article 420, wherein the flow guide 910, 1010 has a profile that varies such that its separation distance to the molded article 420 varies inversely to a thickness of the selected portion of the molded article 420. The post-mold component 900 may be shaped like a pin. The post-mold component 1000 may be shaped like a cup.

The foregoing non-limiting embodiments of the components 100, 200, 300, 400, 500, 600, 700, 800. 900, 1000 may be manufactured by any suitable method. For example, they may be manufactured using traditional manufacturing techniques of free-form fabrication methods such as direct metal laser sintering, as described in the text "Laser Induced Materials and Processes for Rapid Prototyping" by L. Lu et al., ISBN 0-7923-7400-2.

Thus, having described various non-limiting embodiments of the present invention the description shall now turn to a method of cooling the molded article 120, 220, 320, 420 using the foregoing components of the molding system. The method 1000 broadly includes the step of:

Step 1110

Cooling a selected portion of a molded article 120, 220, 320, 420 with a component 100, 200, 300, 400, 500, 600, 700, 800, 900, 1000 of a molding system 402, wherein a heat dissipater 130, 230, 330, 430, 530, 630, 730, 830, 930, 1030 therein imparts a profiled heat removal rate on the selected portion of the molded article 120, 220, 320, 420 that generally matches a heat distribution therein.

The method may further include contacting the selected portion of the molded article 120, 220, 320, 420 with a heat pickup surface 110, 210, 310, 410, 510, 610, 710 of the heat dissipater 130, 230, 330, 430, 530, 630, 730, 830.

The method may further include contacting another component 400, 500, 600 of the molding system 402 with a heat pickup surface 810 of the heat dissipater 830 for cooling the selected portion of the molded article 420 therein.

The contacting the selected portion of the molded article 420 within the component 400, 500, 600, 700 may happen with a molding of the molded article 420 therein.

The method may further include positioning the component 900, 1000 in relation to the selected portion of the molded article 420 such that a flow guide 910, 1010 of the heat dissipater 930, 1030 is positioned to guide a flow of a treatment fluid over the selected portion of the molded article 420.

The positioning the component 900, 1000 in relation to the selected portion of the molded article 420 may happen with a post-mold conditioning of the molded article 420.

As previously discussed, the molded article 420 may be a preform of the type for blow molding into a container and the selected portion thereof is a neck portion 421 that includes a cylindrical wall 424 having a thread 425 protruding therefrom and the cooling 1110 the selected portion of the molded article 420 includes cooling the thread 425 at a first rate and the cylindrical wall 424 at a second rate.

Furthermore, the thread 425 may be interrupted by at least one slot 426, wherein the cooling 1110 the selected portion of the molded article 420 includes cooling the at least one slot 426 at a third rate.

Furthermore, the neck portion 421 may further includes a pilfer band 427 beneath the thread 425, wherein the cooling 1110 the selected portion of the molded article 420 includes cooling the pilfer band 427 at a fourth rate.

Lastly, the neck portion 421 may further include a support ledge 428 beneath the pilfer band 427, wherein the cooling 1110 the selected portion of the molded article 420 includes cooling the support ledge 428 at a fifth rate.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying the invention in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A component of a molding system, comprising:
a heat dissipater that is configured to impart a profiled heat removal rate on a selected portion of a molded article that generally matches a heat distribution therein;
the heat dissipater defines a heat pickup surface;
the heat dissipater includes a heat removal structure for removal of heat therefrom;
the heat dissipater includes a first body having a first thermal conductivity that includes at least one void embedded therein with which to vary a heat removal rate imparted, in use, on the selected portion of the molded article in accordance with the heat distribution therein;
the component is a mold component including at least one of a split insert, a core insert, or an interface component of a mold stack;

the molded article is a preform for blow molding into a container and the selected portion thereof is a neck portion that includes a cylindrical wall having a thread protruding therefrom;

the heat dissipater is configured to cool the thread at a first rate and the cylindrical wall at a second rate;

wherein the thread is interrupted by at least one slot and the heat dissipater is configured to cool the at least one slot at a third rate.

2. The component of claim 1, wherein:

the heat pickup surface is configured to contact the selected portion of the molded article for removal of heat therefrom.

3. The component of claim 1, wherein:

the heat pickup surface is configured to contact another component of the molding system for imparting the profiled heat removal rate on the selected portion of the molded article therein.

4. The component of claim 1, wherein:

the heat dissipater has thermal conductivity that varies with a thickness of the selected portion of the molded article.

5. The component of claim 4, wherein:

the heat dissipater includes relatively low thermal conductivity material next to relatively thin portions of the selected portion of the molded article.

6. The component of claim 4, wherein:

the heat dissipater includes relatively high thermal conductivity material next to relatively thick sections of the selected portion of the molded article.

7. The component of claim 1, wherein:

the heat removal structure is a coolant channel.

8. The component of claim 7, wherein:

the coolant channel has a profile that varies such that its separation distance to the heat pickup surface varies inversely to a thickness of the selected portion of the molded article.

9. The component of claim 1, wherein:

the neck portion further includes a pilfer band beneath the thread; and the heat dissipater is configured to cool the pilfer band at a fourth rate.

10. The component of claim 1, wherein:

the neck portion further includes a support ledge beneath the pilfer band; and the heat dissipater is configured to cool the support ledge at a fifth rate.

* * * * *

(12) EX PARTE REEXAMINATION CERTIFICATE (187th)
Ex Parte Reexamination Ordered under 35 U.S.C. 257

United States Patent
Niewels et al.

(10) Number: US 10,093,055 C1
(45) Certificate Issued: Dec. 2, 2020

(54) COMPONENT OF A MOLDING SYSTEM FOR COOLING A MOLDED ARTICLE

(71) Applicant: Husky Injection Molding Systems Ltd., Bolton (CA)

(72) Inventors: Joachim Johannes Niewels, Thornton, CA (US); Scott Michael Stedman, Mississauga (CA); Jean-Christophe Witz, Yutz (FR); Sven Kmoch, Platten (DE); Ralf Walter Fisch, Saarburg (DE); Ruud Maria Theodorus Luijs, VR Utrecht (NL); Peter Yankov, Bolton (CA)

(73) Assignee: HUSKY INJECTION MOLDING SYSTEMS LTD., Bolton (CA)

Supplemental Examination Request:
No. 96/000,334, Jul. 28, 2020

Reexamination Certificate for:
Patent No.: 10,093,055
Issued: Oct. 9, 2018
Appl. No.: 15/363,252
Filed: Nov. 29, 2016

Related U.S. Application Data

(62) Division of application No. 14/409,076, filed as application No. PCT/CA2013/050420 on May 31, 2013, now Pat. No. 9,539,751.

(60) Provisional application No. 61/663,072, filed on Jun. 22, 2012, provisional application No. 61/662,616, filed on Jun. 21, 2012.

(51) Int. Cl.
*B29C 45/73* (2006.01)
*B29C 45/42* (2006.01)
*B29C 45/72* (2006.01)
*B29L 31/00* (2006.01)

(52) U.S. Cl.
CPC ...... *B29C 45/7312* (2013.01); *B29C 45/4225* (2013.01); *B29C 45/7207* (2013.01); *B29C 45/73* (2013.01); *B29C 2045/7214* (2013.01); *B29K 2995/0013* (2013.01); *B29L 2031/712* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,334, please refer to the USPTO's public Patent Application Information Retrieval (PAIR) system under the Display References tab.

*Primary Examiner* — Elizabeth L McKane

(57) ABSTRACT

Disclosed herein, amongst other things is a component of a molding system (e.g. mold component, post-mold component, etc.) having a heat dissipater that is configured to impart a profiled heat removal rate on a selected portion of a molded article that generally matches a heat distribution therein.

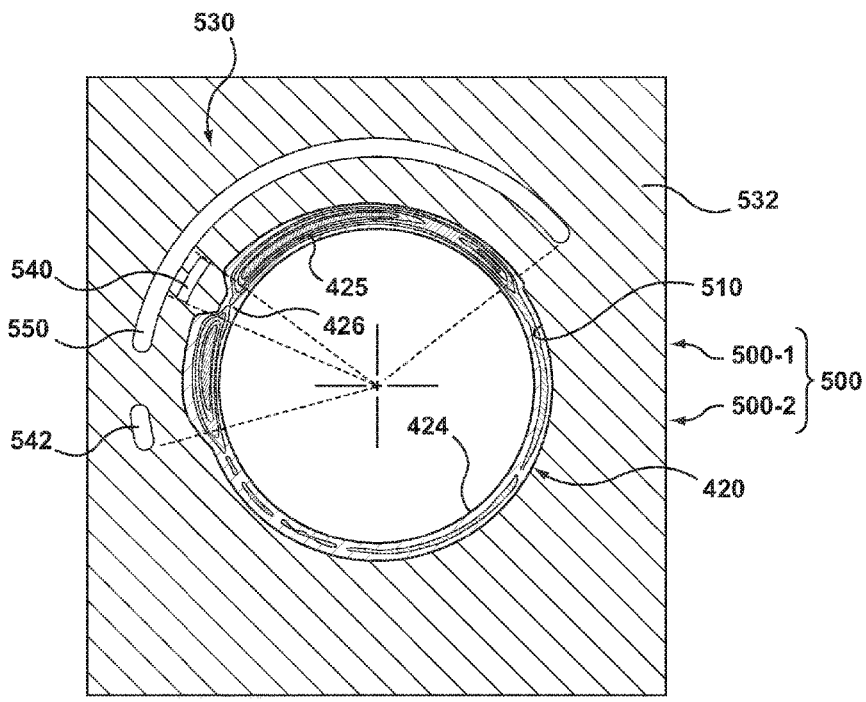

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *